C. W. LEVALLEY.
ARMORED TIRE.
APPLICATION FILED NOV. 30, 1908.
1,124,753.
Patented Jan. 12, 1915.
2 SHEETS—SHEET 1.
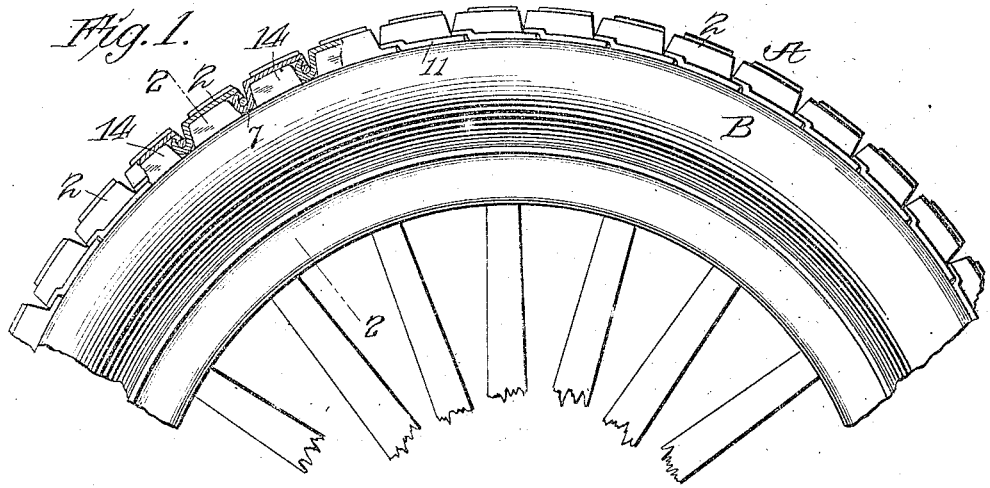
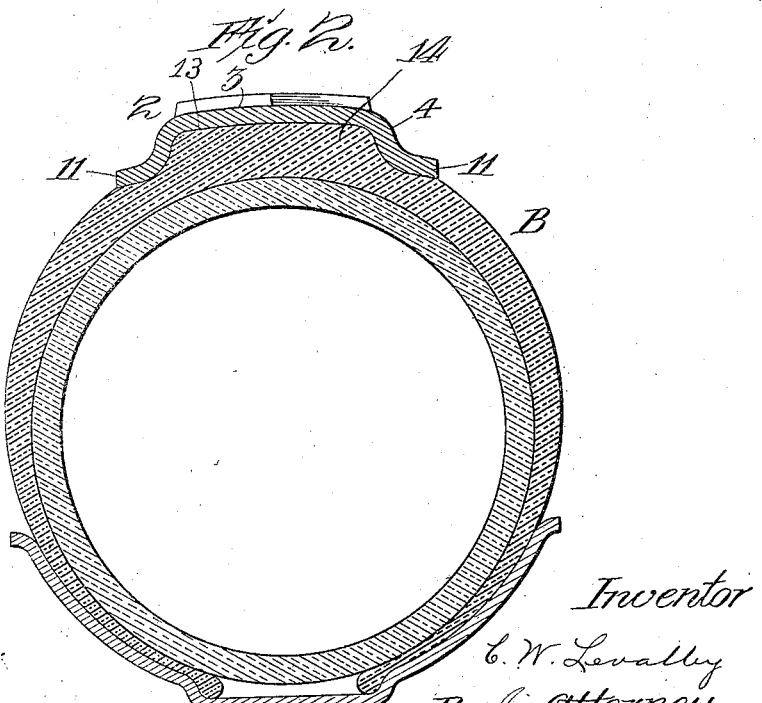
Witnesses:
P. J. Gathmann
L. C. Brady
Inventor
C. W. Levalley
By his Attorney
J. S. Barker

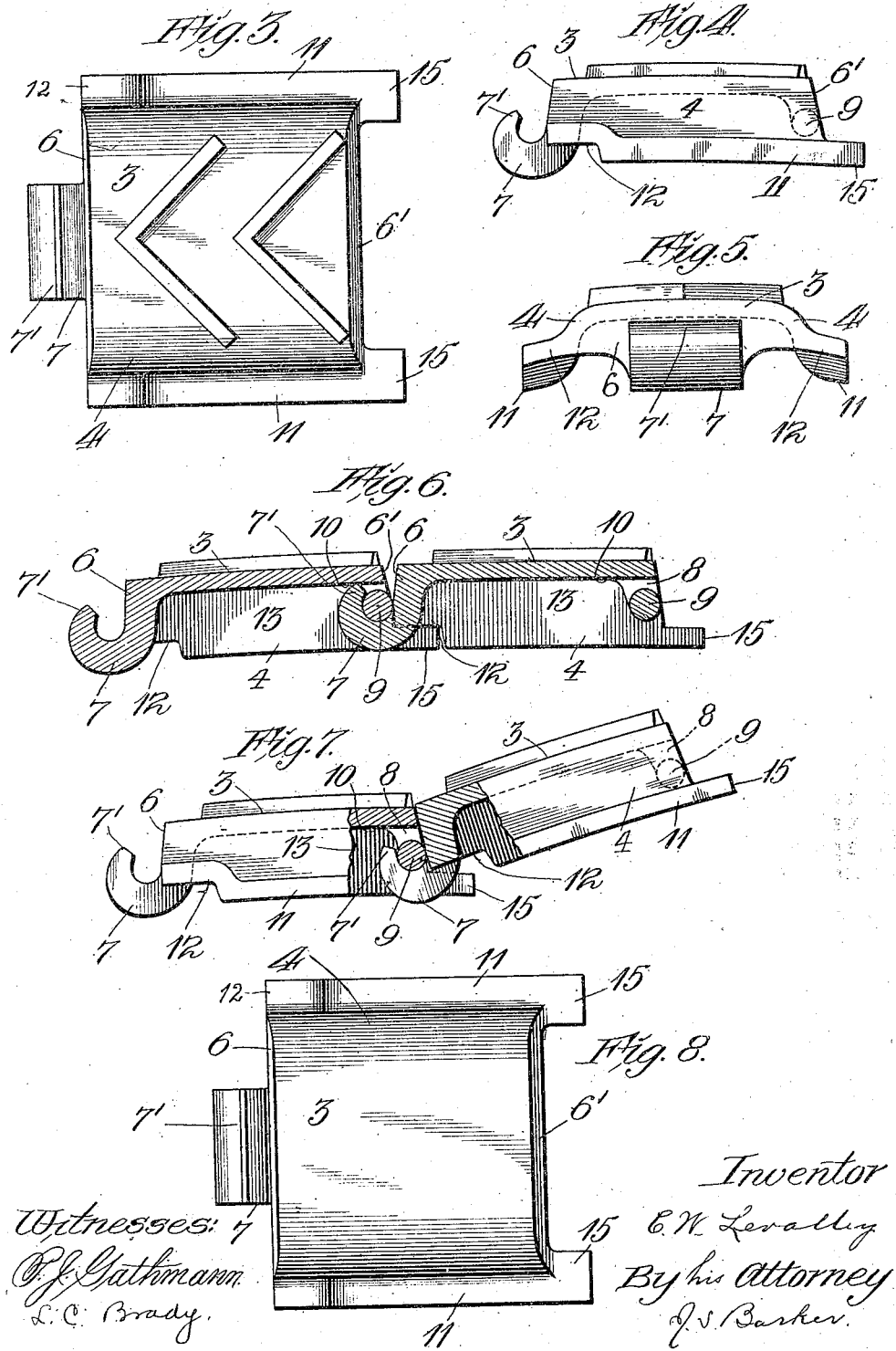

UNITED STATES PATENT OFFICE.

CHRISTOPHER W. LEVALLEY, OF MILWAUKEE, WISCONSIN.

ARMORED TIRE.

1,124,753.  Specification of Letters Patent.  Patented Jan. 12, 1915.

Application filed November 30, 1908. Serial No. 465,260.

*To all whom it may concern:*

Be it known that I, CHRISTOPHER W. LE-VALLEY, a citizen of the United States, and residing at Milwaukee, in the county of Milwaukee, State of Wisconsin, have invented new and useful Improvements in and Relating to Armored Tires, of which the following is a specification.

My invention relates to pneumatic tires, and it has for its object to produce a tire provided with an armored tread surface formed of a plurality of detachable and interlocking sections or links adapted to protect the tire from puncture or injury.

Figure 1 is a side elevation of a section of a tire embodying my invention. Fig. 2 is a transverse section on the line 2—2 Fig. 1. Fig. 3 is a plan view of one of the sections of the armor. Fig. 4 is a side view thereof. Fig. 5 is an end view thereof. Fig. 6 is a longitudinal section of two sections coupled together. Fig. 7 is a view of two links shown in position to be separated one from the other. Fig. 8 is a plan view of another form of one of the armor sections.

In the drawings A indicates the armor adapted to surround and engage with the tread portion of a pneumatic tire B. The armor consists of a series of connected articulating and detachable links or sections 2, united together to form a chain-like structure.

The tread or bearing face of each section is formed of a plate 3 longitudinally curved so as to be substantially parallel with the adjacent portion of the circle formed by the periphery of the tire when inflated, as shown in Figs. 1, 4 and 6, and each plate is also transversely curved, as represented in Figs. 2 and 5. At the sides of the plate 3 of each section there are formed longitudinally arranged depending sides 4, 4, and at the opposite ends of the plate there are formed the depending ends 6, 6', the ends of the sections being arranged to lie close together when coupled, and yet permitting the necessary amount of freedom for articulation between the sections. These ends 6, 6', serve to strengthen the link and to prevent the ends from being bent inward by reason of the blows received through the movement of the tire over the ground.

7 indicates a hook, preferably formed integral with one of the depending ends, 6, and extending outwardly therefrom in a plane below the tread surface of the armor section. The opposite end, 6', of the section is cut away, as shown at 8, to form a cross bar 9 that is adapted to be engaged by the hook 7. The outer end 7' of the hook is made long enough to engage with the under surface 10 of the plate 3 in order to support that portion thereof which is directly above the portion of the end that is cut away to form the cross bar 9.

The plate 3, depending sides 4, 4, and ends 6, 6', of the section together form a shell, in the under side of which is a recess 13 adapted to receive and lie over a boss 14 carried by the tire. The bosses 14 serve to hold the armor in proper position on the tire and prevent it from creeping or slipping off in a transverse direction.

11, 11, indicate flanges, preferably made integral with the longitudinally arranged depending sides 4, 4. These flanges lie on the surface of the tire and serve as bearing faces for the sections. They are bent in their longitudinal direction to conform to the general curvature of the tire. In order to prevent the armor from flexing in an outward direction, the flanges 11 at one end of the section are cut away or off-set, as shown at 12, and at the opposite end they project a short distance beyond the end of the section, as shown at 15, so as to engage with and lie under the cut away portion 12 of an adjoining section. By this means the sections are locked and their outward articulation is limited.

By employing a hook and cross bar as the means for detachably uniting the sections of the armor, I am enabled to make the plane of separation between two adjacent sections straight and to bring such plane very close to the axis of articulation, thereby permitting me to maintain the sections in close relation to each other under all conditions of use.

The armor is placed upon the tire in its deflated condition, and the tire is then pumped up until the armor is tightly bound thereon. Any one of the sections may be detached from the others and a new one replaced, and the armor may be disconnected at any point around its circumference.

The armor herein described is formed of a series of unitary single piece members or sections, linked successively together in such manner that when the links are turned into certain position they are free to uncouple without being moved laterally or out of line with each other, but when brought into working position, where they are held by the inflation of the tire, they are locked against separation. As has already been described the unitary sections of the armor are locked or held against flexing, in an inward direction, beyond their proper working positions, by the engagement of the extensions 15 with the faces 12, and are held from flexing in an outward direction to an extent sufficient to permit the sections being uncoupled, by the tire itself.

What I claim is:

1. In a pneumatic tire, the combination with the tire, of a flexible chain-like structure formed of a series of detachable sections, each section having a tread surface, hook and cross bar connecting means carried by the sections for uniting them, off-set portions at the side edges of one end of each section, and projecting extensions of the side edges of the section at the opposite end thereof arranged to engage the off-set portions of an adjacent section to limit the outward flexing of the sections at their joints, substantially as set forth.

2. The combination with an inflatable tire, of an armor therefor, formed of unitary metallic sections, jointed to each other by hook and cross bar connections separable when adjacent sections are turned to positions away from the tire with which the armor is used, each section having a tread portion and longitudinal edge flanges adapted to rest upon the tire, the said edge flanges being at one end of each section offset, and at the other end extended beyond the articulating member of the section to form lugs arranged to engage with the offset portions of the section to which it may be jointed to prevent outward flexing at the joints of the sections beyond normal working position, substantially as set forth.

CHRISTOPHER W. LEVALLEY.

Witnesses:
V. I. KLOFANDA,
W. C. SARGENT.